US006656261B2

(12) United States Patent
Tear et al.

(10) Patent No.: US 6,656,261 B2
(45) Date of Patent: Dec. 2, 2003

(54) TITANIUM DIOXIDE PIGMENTS WITH IMPROVED GLOSS AND/OR DURABILITY

(75) Inventors: Brian Tear, Grimbsy (GB); John Stratton, Humberston Cleethorpes (GB); Robert Burniston, Waltham Grimbsy (GB)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 09/803,197

(22) Filed: Mar. 9, 2001

(65) Prior Publication Data

US 2002/0166478 A1 Nov. 14, 2002

(51) Int. Cl.$^7$ .................................................. C09C 1/36
(52) U.S. Cl. ........................ 106/439; 106/436; 106/438
(58) Field of Search ................................ 106/436, 438, 106/439

(56) References Cited

U.S. PATENT DOCUMENTS

| 4,224,080 A | | 9/1980 | Chambers et al. |
| 4,328,040 A | | 5/1982 | Panek et al. |
| 4,405,376 A | * | 9/1983 | Matsunaga et al. ......... 106/438 |
| 6,342,099 B1 | * | 1/2002 | Hiew et al. ................. 106/438 |

FOREIGN PATENT DOCUMENTS

| EP | 0 406 194 | 1/1991 |
| GB | 2 271 765 | 4/1994 |
| WO | WO 95/12638 | 5/1995 |
| WO | WO 98/32803 | 7/1998 |

* cited by examiner

*Primary Examiner*—C. Melissa Koslow
*Assistant Examiner*—Shalie Manlove
(74) *Attorney, Agent, or Firm*—William D. Schmidt; David A. Kalow; Kalow & Springut LLP

(57) ABSTRACT

The present invention provides titanium dioxide pigments with improved gloss and/or durability. The titanium dioxide pigments are made by treating titanium dioxide with a plurality of metal salts under conditions suitable to form the titanium dioxide pigment having improved gloss and/or durability, wherein at least one metal salt is capable of providing a monovalent anion. Preferred pigments of the present invention are substantially-sulfate free.

31 Claims, No Drawings

TITANIUM DIOXIDE PIGMENTS WITH IMPROVED GLOSS AND/OR DURABILITY

BACKGROUND OF THE INVENTION

Titanium dioxide ($TiO_2$) is an important pigment in the manufacture of paints, plastics, and coatings. There has been a considerable research effort to make titanium dioxide pigments with desirable properties (i.e., fine particle size, gloss and durability).

Titanium dioxide is produced commercially in two crystalline polymorphic forms, namely the rutile form which can be produced by both the chloride and sulfate processes and the anatase form which is produced by the sulfate process. These processes are well known in the art.

Anatase and rutile forms of $TiO_2$ differ not only in their crystallographic structures but also in the type and amount of surface and other impurities resulting from their differing methods of production. These impurities can cause particle agglomeration, effect particle size distribution and ultimately pigment gloss and/or durability.

The prior art discloses adding different chemicals before or during titanium dioxide formation to prevent unwanted growth and agglomeration of titanium dioxide that may effect gloss and durability in the end product. For example, in the chloride process, titanium dioxide is made by reacting titanium tetrachloride ($TiCl_4$) with oxygen. The prior art describes adding aluminum trichloride ($AlCl_3$) with $TiCl_4$ to promote substantially rutile titanium dioxide formation. One way to reduce particle size and agglomerates is to add a silicon halide (i.e. silicon tetrachloride). The reaction between silicon tetrachloride ($SiCl_4$) and oxygen results in the formation of silica that reduces the sintering rate of titania and results in smaller particles and fewer agglomerates. Unfortunately, $SiCl_4$ addition promotes unwanted anatase that may result in a less durable pigment.

Other prior art references disclose treating titanium dioxide after the pigment is produced. For example, the prior discloses improving gloss and durability of titanium dioxide pigment by coating or wet treating the pigment with inorganic compounds. Wet treatment processes are well known in the art and typically involve precipitating hydrous oxide coatings onto the titanium dioxide pigment from metal salt solutions. Some pigment coatings include oxides and hydroxides of alumina, silica, zirconium and phosphate. These wet treatment processes can result in a more durable pigment with improved gloss.

In general, inorganic coatings are known to improve durability, dispersibility and/or gloss of the titanium dioxide pigment. However, some coatings cause the formation of agglomerates that tend to cause difficulties in dispersing pigments into various compositions thereby reducing gloss and durability.

Based on the foregoing, there is still a need for titanium dioxide pigments that have improved gloss and/or durability. These pigments are useful in the manufacture of paints, plastics, and other coating systems.

SUMMARY OF THE INVENTION

The present invention provides titanium dioxide pigments with reduced particle size, improved gloss and/or durability and methods of making these pigments. Preferred titanium dioxide pigments of the present invention are substantially free from sulfate.

In one embodiment, the present invention provides a method for preparing titanium dioxide pigment having improved gloss and/or durability comprising: treating titanium dioxide with a plurality of metal salts under conditions suitable to form the titanium dioxide pigment having improved gloss and/or durability, wherein at least one of the plurality of metal salts is capable of providing a monovalent anion.

In another embodiment, the present invention provides a method for preparing titanium dioxide pigment, having improved gloss and/or durability comprising: wet treating titanium dioxide with an alumina compound, a zirconia compound capable of providing a monovalent anion and a phosphate compound under conditions suitable to form the titanium dioxide pigment having improved gloss and/or durability.

In still another embodiment, the present invention provides a method for preparing titanium dioxide pigment having improved gloss and/or durability, comprising: wet treating an aqueous slurry of titanium dioxide with an alumina compound, a zirconia compound capable of providing a monovalent anion and a phosphate compound under conditions suitable to form the titanium dioxide pigment having improved gloss and/or durability.

In one exemplary embodiment, the present invention provides a titanium dioxide pigment having improved gloss and/or durability produced by a method comprising: wet treating titanium dioxide with an alumina compound, a zirconia compound capable of providing a monovalent anion and a phosphate compound under conditions suitable to form the titanium dioxide pigment having improved gloss and/or durability.

In another exemplary embodiment, the present invention provides a titanium dioxide pigment having improved gloss and/or durability produced by a method comprising: wet treating an aqueous slurry of titanium dioxide with an alumina compound, a zirconia compound capable of providing a monovalent anion and a phosphate compound under conditions suitable to form the titanium dioxide pigment having improved gloss and/or durability.

In yet another exemplary embodiment, the present invention provides, a substantially sulfate-free titanium dioxide pigment having improved gloss and/or durability comprising: titanium dioxide base surface treated with an alumina compound, a zirconia compound and a phosphate compound.

For a better understanding of the present invention together with other and further embodiments, reference is made to the following description taken in conjunction with the examples, the scope of which is set forth in the appended claims.

DETAILED DESCRIPTION OF THE INVENTION

In preparing the preferred embodiments of the present invention, various alternatives may be used to facilitate the objectives of the invention. These embodiments are presented to aid in an understanding of the invention and are not intended to, and should not be construed to, limit the invention in any way. All alternatives, modifications and equivalents that may become obvious to those of ordinary skill upon reading the present disclosure are included within the spirit and scope of the present invention.

This disclosure is not a primer on $TiO_2$ pigment production, basic concepts known to those skilled in the field of $TiO_2$ production have not been set forth in detail. Concepts such as choosing appropriate reactor, additives for $TiO_2$ pigment production, or suitable conditions for wet treatment (i.e., temperature, pH, residence times, etc) are readily determinable by those skilled in the industry and are generally described in the prior art. Attention is therefore directed to the appropriate texts and references known to those skilled in the art with regard to these matters.

The titanium dioxide pigments of the present invention are prepared starting with titanium dioxide base particles. Titanium dioxide base particles are produced commercially in two crystalline forms, namely the rutile form which is usually produced by the chloride and sulfate processes and the anatase form which is usually produced by the sulfate process. Both of these processes are well known to those skilled in the art. The present invention is applicable to both the rutile and anatase forms of $TiO_2$ pigment.

Preferably, the base titanium dioxide pigment is substantially free from metal salts capable of generating polyvalent anions i.e., sulfate anions ($SO_4^{2-}$). Thus, the present invention contemplates treating titanium dioxide base with at least one metal salt capable of generating monovalent anions. Suitable metal salts capable of generating monovalent anions include silicon halides, such as $SiBr_4$, $SiF_4$, $SiI_4$, $SiCl_4$, alumina halides, i.e., $AlCl_3$, $AlBr_3$ and $AlI_3$, and zirconia halides, such as, $ZrCl_4$. These metal salts can be introduced into the reactor before or during $TiO_2$ formation by methods known in the art.

As used herein, substantially sulfate-free means that the $TiO_2$ is essentially free from the sulfate anions adsorbed on the base structure of the $TiO_2$. Substantially sulfate-free $TiO_2$ base can be made by limiting sulfate content of reactants, i.e., using metal salts capable of generating monovalent anions. Alternately, substantially sulfate-free $TiO_2$ base can be made by washing the $TiO_2$ base to remove structural sulfate ions. Preferably, the $TiO_2$ pigment is at least 99% free from sulfate and more preferably at least 99.9% free from sulfate or higher.

In one embodiment of the present invention, after the $TiO_2$ base particles are produced, the base is subjected to wet milling or grinding by methods known in the art to provide a base of substantially uniform particle size. Preferably, the base particle has a size range of less than about 1.0 micron, and more preferably, between about 0.1 microns and about 0.5 microns, and most preferably between about 0.1 microns and about 0.3 microns.

Preferably, base $TiO_2$ particles are incorporated into an aqueous slurry, where it is wet treated. Slurries of titanium dioxide base can be made by methods known in the art. Preferably, the slurry has a $TiO_2$ solids content of greater than about 5%, more preferably, less than about 75% and most preferably, the $TiO_2$ slurry has a $TiO_2$ solids content of greater than about 30%.

Typically, the pH of the slurry can be determined by those skilled in the art and adjusted to a desired pH range using methods known in the art. For example, if adjustment of the pH of the slurry becomes necessary, such adjustment can be made by simply adding a suitable acid or suitable base. Suitable acids include water soluble acids such as hydrochloric acid, nitric acid, and the like. Preferably, the pH of the initial slurry is at least about 3.4. Suitable bases include water soluble alkaline bases such as ammonia, sodium hydroxide or other suitable alkaline bases.

In the most preferred embodiment of the present invention, the titanium dioxide base is wet treated. Methods of wet treatment are known in the art and typically involve precipitating hydrous oxide compounds onto the titanium dioxide base. Compounds suitable for use in the present invention include alumina, zirconium and phosphate compounds. These compounds are capable of providing oxide or hydrous oxide coatings on the base titanium dioxide particle.

While not wishing to be bound to any one particular theory, it has been discovered that soluble metal salts with polyvalent anions (i.e., sulfate ions ($SO_4^{2-}$)) tend to remain structurally on the pigment due to ion exchange with the surface of the pigment and coating. Conventional washing does not remove these polyvalent anions. Soluble polyvalent anions present after the titanium dioxide pigment is surface treated can cause flocculation, reducing dispersibility and thus opacity of the end product, as well as gloss and/or durability of the pigment. Metal salts with monovalent anions (i.e., chlorine, bromine, acetate, fluorine) have reduced tendency to flocculate, thus dispersibility, opacity of the end product, as well as gloss and/or durability of the titanium dioxide pigment are improved.

Alumina compounds added to the slurry include hydrous alumina compounds such as for example, water soluble alkali metal aluminates. Some water soluble alkali metal aluminates, include but are not limited to sodium aluminate or potassium aluminate. Some other alumina compounds include aluminum halides, i.e., aluminum chloride, aluminum bromide, and the like. Most preferably, the alumina compound is substantially sulfate-free and comprises sodium aluminate.

The weight percent of the alumina compound can vary depending on the wet treatment. Preferably, the alumina compound is added to the slurry in an amount to provide from about 0.5% to about 5.0% $Al_2O_3$ by weight, more preferably from about 1.0% to about 3.0% by weight $Al_2O_3$ based upon the total weight of the titanium dioxide pigment.

For purposes of the present invention, any water soluble zirconia compound capable of providing monovalent anions can be used under the operating conditions of the methods of the present invention. Zirconia compounds suitable for use in the present invention include zirconia comprising monovalent anions such as for example, zirconia acetate, zirconia halides, i.e., zirconium chloride, zirconium oxychloride, and the like. Most preferably, the zirconia compound is substantially sulfate-free and comprises zirconium oxychloride.

The weight percent of the zirconia compound can vary depending on the layer precipitated on the titanium dioxide base. Preferably, the zirconia compound is precipitated in an amount of from about 0.1% to about 3.0% by weight $ZrO_2$, more preferably from about 0.1% to about 0.4% by weight $ZrO_2$ based on the total weight of the titanium dioxide pigment.

Suitable phosphate compounds added to the slurry include any water soluble phosphate compound capable of providing an insoluble phosphate for deposition upon the titanium dioxide base under suitable operating conditions. Suitable phosphate compounds for use in the present invention include water soluble phosphate compounds, such as for example, tetrapotassium pyrophosphate, sodium polyphosphate, tetrasodium pyrophosphate, sodium tripolyphosphate, potassium tripolyphosphate, sodium hexametaphosphate, phosphoric acid, and the like. Most preferably, the water soluble phosphate compound is substantially sulfate-free and comprises sodium hexametaphosphate.

The weight percent of the phosphate compound can vary depending on the wet treatment. Preferably, the phosphate compound provides from about 0.1% to about 1.0% by weight $P_2O_5$, more preferably from about 0.1% to about 0.5% by weight that provides insoluble $P_2O_5$ based on the total weight of the titanium dioxide pigment.

The temperature of the slurry can easily be determined by those skilled in the art to facilitate the wet treatment process. The slurry can be heated using conventional heating means known by those skilled in the art, such as for example, by steam.

The order of addition is not critical in the present invention. Thus, in one embodiment, the present invention contemplates additions of alumina, zirconia and phosphate compounds in any order.

Upon completion of the addition of the alumina, zirconia and phosphate compounds. The resultant titanium dioxide pigment is recovered by filtration. Preferably, the pigment is washed substantially free of salts (if any) adhering to the pigment and/or not adhering to the pigment, dried and then subjected to final milling using fluid energy milling techniques known in the art. Preferably, the washed and dried pigment is micronized in a steam or air micronizer at intensities known by those skilled in the art.

Optionally, a polyol such as for example, trimethylolpropane (TMP), trimethylolethane (TME) or pentaerythritol, and the like, can be added to the pigment during steam or air micronization. In the most preferred embodiment, TMP is added in an amount of from about 0.2% to 0.4% based on the weight of the titanium dioxide pigment.

It has unexpectedly been discovered that the coated or wet treated pigments produced by the methods of the present invention have improved gloss and/or durability. These pigments are multipurpose and suitable for use in paints, plastics, and coatings, where both durability and gloss are needed.

Gloss is determined by methods known in the art. Preferably, gloss is determined by incorporating the pigment into paint and measuring the gloss using a gloss meter. In the most preferred method, the pigments made by the methods of the present invention are incorporated into acrylic based paints at 40% PVC (pigment volume concentration) and the gloss measured.

Durability of the pigments of the present invention can be determined by methods known in the art. Some methods of measuring durability include measuring photocatalytic activity of the pigment, acid solubility of the titanium dioxide base, natural exposure and weatherometer testing. Most preferably, durability is measured by natural exposure or weatherometer testing. In the later case, total gloss values are the sum of the individual gloss readings. The higher the total, the better the gloss and overall durability of the pigment.

Weatherometer testing involves incorporating the pigments into, for example, paint and subjecting the paint to exposure in an Atlas Weatherometer and then comparing the coated pigments with other pigments i.e., sulfate containing pigments. The pigments are then rated as to durability.

As used herein, improved gloss includes increases in gloss when compared to pigments produced with polyvalent anions, i.e., sulfate. Increased gloss includes increases from about 1% to about 100% or higher, over pigment with polyvalent anions, i.e., sulfate.

Improved durability includes increases in durability when compared to pigments produced with polyvalent anions, i.e., sulfate. Increased durability includes increases from about 1% to about 100% or higher, over pigment with polyvalent anions, i.e., sulfate.

Having now generally described the invention, the same may be more readily understood through the following reference to the following examples, which are provided by way of illustration and are not intended to limit the present invention unless specified.

EXAMPLES

The following examples are presented to aid in an understanding of the present invention and are not intended to, and should not be construed to, limit the invention in any way. All alternatives, modifications and equivalents that may become obvious to those of ordinary skill in the art upon a reading of the present disclosure are included within the spirit and scope of the invention.

The examples demonstrate improved gloss and/or durability of titanium dioxide pigments produced having essentially no polyvalent anions (i.e., sulfate) present during the surface coating process. The high gloss potential of the pigment is related to the final particle size distribution developed in the paint and is also a function of the distribution of the titanium dioxide pigment after manufacturing operations. Accordingly, smaller size and distribution maximizes the gloss potential when the pigment is ground via for example micronizer operations. The easier a pigment breaks down during the grinding, the better the gloss potential for a fixed grinding energy. Using sulfate-free coating methods, it has been found that the final gloss potential and particle size distribution of the final pigment can be improved.

Example 1

Titanium dioxide base having a mean diameter of 0.27 to 0.28 microns and a geometric standard deviation of 1.41 to 1.43 was slurried to produce a concentration of 325 g/l. The slurry was agitated and heated to 65° C. and $P_2O_5$ was added from sodium hexametaphosphate solution. $ZrO_2$ from zirconyl chloride solution was added to the slurry. After agitation for 10 minutes, sufficient HCl was then added to react with the first $Al_2O_3$ addition which was then added in the form of sodium aluminate solution. The pH was then adjusted with HCl to at least 3.4 if the pH was greater at this point. After further agitation for 10 minutes, the slurry was neutralized to pH 5.5 with NaOH solution. This was followed by a second $Al_2O_3$ addition from sodium aluminate solution. The slurry was agitated for 10 minutes and neutralized to pH 6.3 with HCl. After further agitation for 10 minutes, the pH was then adjusted to pH 6.3 and the pigment processed. After filtration and washing, the product was spray dried and air micronized at 130 psi injector and grind ring pressure in the presence of 0.35% trimethylpropane.

The final pigment composition (expressed as % oxide with respect to the base $TiO_2$ content) is shown in Table 1.

TABLE 1

| Oxide | % | Source chemical |
|---|---|---|
| $Al_2O_3$ | 2.00 | Sodium aluminate |
| $ZrO_2$ | 0.30 | $ZrOCl_2$ or $ZrOSO_4$ |
| $P_2O_5$ | 0.33 | Sodium hexametaphosphate |

Various commercially available sources of zirconia salts were used in the wet treatment process and the properties of the product produced using $ZrOCl_2$ are compared (Table 2) with that from the $ZrOSO_4$ sources, i.e., the sulfate free and sulfate containing versions.

TABLE 2

| Type of salt | Source | 40% PVC Acrylic Gloss | Geometric mean particle size (micron) | Geometric standard deviation |
|---|---|---|---|---|
| ZrOCl$_2$ | A | 58 | 0.282 | 1,445 |
| ZrOCl$_2$ | B | 58 | 0.281 | 1,446 |
| ZrOCl$_2$ | C | 59 | 0.280 | 1,441 |
| ZrOSO$_4$ | D | 51 | 0.289 | 1,460 |
| ZrOSO$_4$ | E | 51 | 0.291 | 1,459 |

The gloss retention of an alkyd paint was monitored (Table 3) under accelerated weathering conditions using products from commercially available sources A, B, C, D and E.

TABLE 3

| Type of salt | Source | Total unwashed gloss | Total washed gloss |
|---|---|---|---|
| ZrOCl$_2$ | A | 1016 | 1065 |
| ZrOCl$_2$ | B | 1009 | 1048 |
| ZrOCl$_2$ | C | 1029 | 1064 |
| ZrOSO$_4$ | D | 993 | 1047 |

Total gloss values are the summation of the individual readings—the higher the total, the better the durability. The improvement in gloss potential found with the sulfate-free pigment was also seen as improved gloss retention and hence durability.

Example 2

The procedure in Example 1 was repeated using two more sources of ZrOCl$_2$ (F) and then the ZrOSO$_4$ (source D) was used instead of ZrOCl$_2$. At the same time, the opacity as measured by scattering coefficient was also measured in an alkyd paint formulation. The sulfate-free pigment showed improved gloss potential and opacity (Table 4).

TABLE 4

| Type of salt | Source | 40% PVC Acrylic Gloss | Scattering Coefficient |
|---|---|---|---|
| ZrOCl$_2$ | A | 52 | 6.49 |
| ZrOCl$_2$ | F | 51 | 6.43 |
| ZrOCl$_2$ | F (second sample) | 50 | 6.39 |
| ZrOSO$_4$ | D | 46 | 6.36 |

Having thus described and exemplified the invention with a certain degree of particularity, it should be appreciated that the following claims are not to be so limited but are to be afforded a scope commensurate with the wording of each element of the claim and equivalents thereof.

What is claimed:

1. A method for preparing titanium dioxide pigment having improved gloss and/or durability comprising: a) treating titanium dioxide with a zirconia compound to form a first layer on the titanium dioxide consisting of sulfate-free zirconia; and b) treating the zirconia treated titanium dioxide with an alumina compound to form a second layer comprising sulfate-free alumina under conditions suitable to form the titanium dioxide pigment having improved gloss and/or durability, wherein the titanium dioxide pigment is substantially sulfate-free.

2. A method according to claim 1, wherein the zirconia compound is zirconium oxychloride, and wherein the alumina compound is selected from the group consisting of potassium aluminate, sodium aluminate, aluminum chloride, and aluminum trichloride.

3. A method according to claim 1 further comprising treating the titanium dioxide with a phosphate compound selected from the group consisting of potassium tripolyphosphate, sodium hexametaphosphate, tetrapotassium pyrophosphate, sodium polyphosphate, tetrasodium pyrophosphate, sodium tripolyphosphate, and phosphoric acid.

4. A method according to claim 1, wherein the zirconium compound or the alumina compound is capable of providing a monovalent anion, wherein the monovalent anion is a halogen selected from the group consisting of chlorine, bromine, and fluorine.

5. A method according to claim 1, wherein the zirconium compound is zirconium oxychloride.

6. A method according to claim 1, wherein the titanium dioxide is anatase or rutile.

7. A method according to claim 2, wherein the alumina compound comprises sodium aluminate and the zirconium compound is zirconium oxychloride.

8. A method according to claim 5, wherein the zirconium oxychloride comprises from about 0.1 to about 2.0% by weight ZrO$_2$ based on the total weight of the titanium dioxide pigment.

9. A method according to claim 5, wherein the zirconium oxychloride comprises about 0.3% by weight ZrO$_2$ based on the total weight of the titanium dioxide pigment.

10. A method for preparing titanium dioxide pigment, having improved gloss and/or durability comprising: wet treating titanium dioxide with a sulfate-free alumina compound to form an alumina layer on the titanium dioxide, and wet treating the alumina treated titanium dioxide with a sulfate-free zirconia compound so as to form a sulfate-free zirconia layer thereby forming the titanium dioxide pigment having improved gloss and/or durability, wherein the titanium dioxide pigment is substantially sulfate-free.

11. A method according to claim 10, wherein the alumina compound is selected from the group consisting of potassium aluminate, sodium aluminate, and aluminum chloride.

12. A method according to claim 10, wherein the zirconia compound is zirconium oxychloride.

13. A method according claim 12, wherein the zirconium oxychloride comprises from about 0.1% to about 2.0% by weight ZrO$_2$ based on the total weight of the titanium dioxide pigment.

14. A method according to claim 12, wherein the zirconium oxychloride comprises about 0.3% by weight ZrO$_2$ based on the total weight of the titanium dioxide pigment.

15. A method according to claim 10, wherein the phosphate compound is selected from the group consisting of potassium tripolyphosphate, sodium hexametaphosphate, tetrapotassium pyrophosphate, sodium polyphosphate, tetrasodium pyrophosphate, sodium tripolyphosphate, and phosphoric acid.

16. A method according to claim 10, wherein the zirconia compound is capable of providing a monovalent anion that is a halogen selected from the group consisting of chlorine, bromine, and fluorine.

17. A method according to claim 10, wherein the titanium dioxide is anatase or rutile.

18. A method for preparing titanium dioxide pigment having improved gloss and/or durability, comprising: wet treating an aqueous slurry of titanium dioxide with a sulfate-free alumina compound to form an alumina layer on the titanium dioxide, wet treating the alumina treated titanium dioxide with a sulfate-free zirconia compound capable of providing a monovalent anion to form a sulfate-free zirconia layer and wet treating the zirconia layer with a phosphate compound under conditions suitable to form the titanium dioxide pigment having improved gloss and/or durability, wherein the titanium dioxide pigment is substantially sulfate-free.

19. A method according to claim 18, wherein the titanium dioxide is anatase or rutile.

20. A method according to claim 18, wherein the alumina compound comprises from about 1% to about 3.0% by weight $Al_2O_3$ based on the total weight of the titanium dioxide pigment.

21. A method according to claim 18, wherein the zirconia compound comprises from about 0.1% to about 2.0% by weight $ZrO_2$ based on the total weight of the titanium dioxide pigment.

22. A method according to claim 18, wherein the phosphate compound comprises from about 0.1% to about 2.0% by weight $P_2O_5$ based on the total weight of the titanium dioxide pigment.

23. A titanium dioxide pigment having improved gloss and/or durability produced by a method comprising: a) wet treating titanium dioxide with an alumina compound to form a sulfate-free alumina layer on the titanium dioxide; b) wet treating the alumina treated titanium dioxide with a sulfate-free zirconia compound to form a sulfate-free zirconia layer; and c) wet treating the alumina and zirconia treated titanium dioxide with a sulfate-free phosphate compound under conditions suitable to form the titanium dioxide pigment having improved gloss and/or durability, wherein the titanium dioxide pigment is substantially sulfate-free.

24. A method according to claim 23, wherein the zirconia compound is zirconium oxychloride.

25. A titanium dioxide pigment having improved gloss and/or durability produced by a method comprising: wet treating an aqueous slurry of titanium dioxide with a sulfate-free alumina compound, wet treating the alumina treated titanium dioxide with a sulfate-free zirconia compound capable of providing a monovalent anion to form a sulfate-free zirconia layer, and wet treating the alumina and zirconia treated titanium dioxide with a sulfate-free phosphate compound under conditions suitable to form the titanium dioxide pigment having improved gloss and/or durability, wherein the titanium dioxide pigment is substantially sulfate-free.

26. A titanium dioxide pigment according to claim 15, wherein the zirconia compound is zirconium oxychloride.

27. A substantially sulfate-free titanium dioxide pigment having improved gloss and/or durability comprising: titanium dioxide base, surface treated with an alumina compound, a zirconia compound on the alumina compound and a phosphate compound on the alumina compound.

28. A substantially sulfate-free titanium dioxide pigment according to claim the alumina compound comprises from about 1% to about 3.0% by weight $Al_2O_3$ based on the total weight of the titanium dioxide pigment.

29. A substantially sulfate-free titanium dioxide pigment according to claim 27, wherein the zirconia compound comprises from about 0.1% to about 2.0% by weight $ZrO_2$ based on the total weight of the titanium dioxide pigment.

30. A substantially sulfate-free titanium dioxide pigment according to claim 27, wherein the phosphate compound comprises from about 0.1% to about 2.0% by weight $P_2O_5$ based on the total weight of the titanium dioxide pigment.

31. A substantially sulfate-free titanium dioxide pigment having improved gloss and/or durability comprising: titanium dioxide base, surface treated with a compound consisting of zirconia, an alumina compound on the zirconia compound, and a phosphate compound on the zirconia compound.

* * * * *